US012688003B2

(12) United States Patent
Law et al.

(10) Patent No.: US 12,688,003 B2
(45) Date of Patent: Jul. 21, 2026

(54) SYSTEMS AND METHODS FOR SCALABLE MANAGEMENT OF AUDIO SYSTEM DEVICES

(71) Applicant: Shure Acquisition Holdings, Inc., Niles, IL (US)

(72) Inventors: Daniel Aaron Law, Glencoe, IL (US); Brendan Beresford Fox, Portland, OR (US); Ilya Trager, Buffalo Grove, IL (US)

(73) Assignee: Shure Acquisition Holdings, Inc., Niles, IL (US)

( * ) Notice: Subject to any disclaimer, the term of this patent is extended or adjusted under 35 U.S.C. 154(b) by 756 days.

(21) Appl. No.: 17/305,780

(22) Filed: Jul. 14, 2021

(65) Prior Publication Data

US 2022/0019400 A1 Jan. 20, 2022

Related U.S. Application Data

(60) Provisional application No. 63/052,225, filed on Jul. 15, 2020.

(51) Int. Cl.
*G06F 3/16* (2006.01)
*H04R 5/04* (2006.01)

(52) U.S. Cl.
CPC .............. *G06F 3/165* (2013.01); *G06F 3/162* (2013.01); *H04R 5/04* (2013.01)

(58) Field of Classification Search
CPC ............ G06F 3/165; G06F 3/162; H04R 5/04
See application file for complete search history.

(56) References Cited

U.S. PATENT DOCUMENTS

| | | |
|---|---|---|
| 9,882,995 B2 | 1/2018 | Van Erven |
| 10,102,422 B2 | 10/2018 | Oh |
| 10,248,399 B2 | 4/2019 | Yoon |
| 10,375,174 B2 | 8/2019 | Haidar |
| 10,382,509 B2 | 8/2019 | Williams |
| 10,587,602 B2 | 3/2020 | Coburn, IV |
| 2007/0239899 A1 | 10/2007 | Gonen |
| 2014/0040482 A1* | 2/2014 | Wong ...................... H04W 4/80 709/227 |
| 2015/0079959 A1 | 3/2015 | Daudelin |
| 2017/0286256 A1 | 10/2017 | Jayaraman |
| 2018/0225795 A1 | 8/2018 | Napoli |
| 2019/0340098 A1 | 11/2019 | Green, III |
| 2019/0373313 A1 | 12/2019 | Jackson |

(Continued)

FOREIGN PATENT DOCUMENTS

| | | |
|---|---|---|
| CN | 102547251 | 7/2012 |
| CN | 103324868 | 9/2013 |

(Continued)

OTHER PUBLICATIONS

International Search Report and Written Opinion for PCT/US2021/070874 dated Dec. 3, 2021, 21 pp.

(Continued)

*Primary Examiner* — Joseph Saunders, Jr.
(74) *Attorney, Agent, or Firm* — Alston & Bird LLP

(57) ABSTRACT

A middleware component of an audio system configured to operate with a plurality of audio devices operating in different environments to centralize management of certain aspects of such audio devices.

26 Claims, 3 Drawing Sheets

(56)     References Cited

U.S. PATENT DOCUMENTS

2020/0084506 A1    3/2020  Kuper
2020/0177703 A1*   6/2020  Panda ................... G16Y 30/00

FOREIGN PATENT DOCUMENTS

CN          108173840       6/2018
CN          110570859      12/2019
CN          111683218       9/2020

OTHER PUBLICATIONS

Invitation to Pay Additional Fees for PCT/US2021/070874 dated Oct. 12, 2021, 15 pp.
Martin, "What is shadow IoT? How to mitigate the risk," IDG Communications, Inc., Mar. 5, 2019, 7 pp.
Murphy, "What is Shadow IoT? How IT Teams Can Defend Their Networks," Infoblox, Feb. 5, 2020, 4 pp.
Burk, "How to wrap a Rest API with GraphOL—A 3-step tutorial," Prisma, Feb. 22, 2018, 24 pp.
Bryant, "GraphQL for Archival Metadata: An Overview of the EHRI GraphQL API," 2017 IEEE International Conference on Big Data, 6 pp.
Liu, et al., Communications Enablement of Software-as-a-Service (SaaS) Applications, IEEE Global Telecommunications Conference, 2009, 8 pp.

* cited by examiner

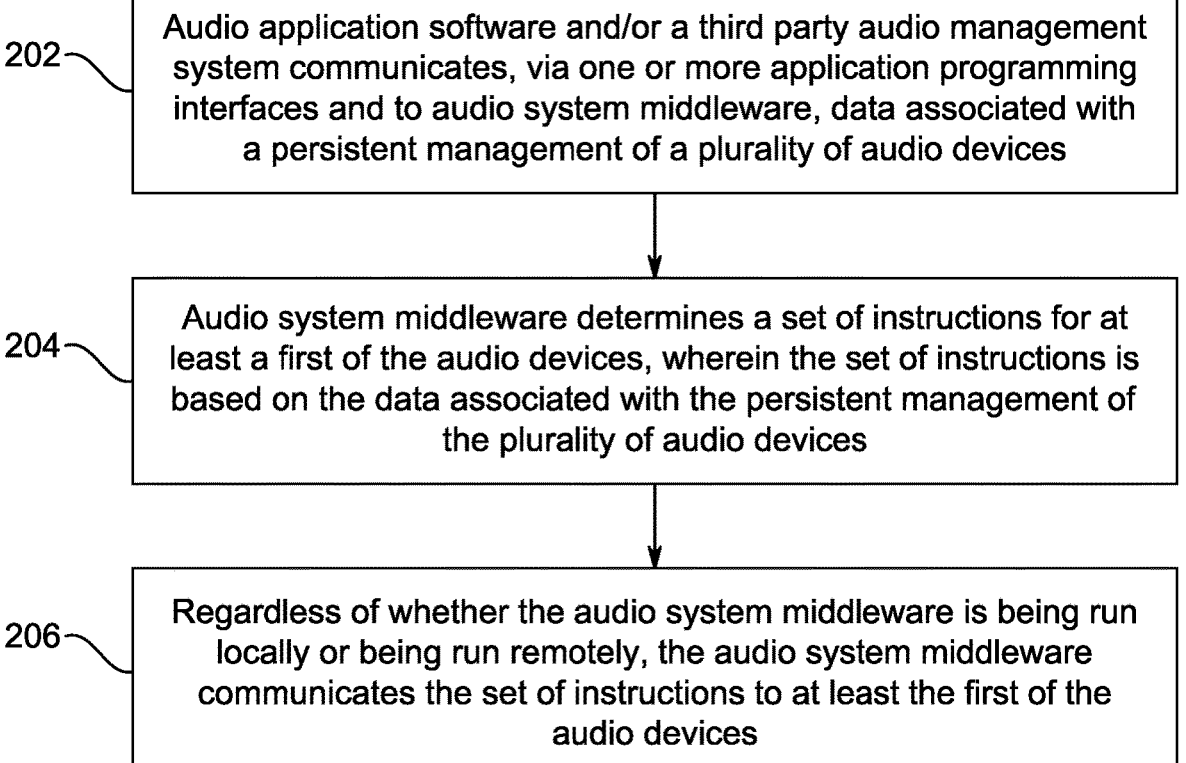

202 — Audio application software and/or a third party audio management system communicates, via one or more application programming interfaces and to audio system middleware, data associated with a persistent management of a plurality of audio devices 204 — Audio system middleware determines a set of instructions for at least a first of the audio devices, wherein the set of instructions is based on the data associated with the persistent management of the plurality of audio devices 206 — Regardless of whether the audio system middleware is being run locally or being run remotely, the audio system middleware communicates the set of instructions to at least the first of the audio devices

User Interface
306

Communication
Interface
308

Processor
302

Memory
304

Native Speaker
Device
310

Native Microphone
Device
312

SYSTEMS AND METHODS FOR SCALABLE MANAGEMENT OF AUDIO SYSTEM DEVICES

CROSS-REFERENCE

This application claims priority to U.S. Provisional Patent Application No. 63/052,225, filed on Jul. 15, 2020, the contents of which are fully incorporated by reference herein.

TECHNICAL FIELD

This application generally relates to middleware and application programming interface ("API") components of an audio system configured to operate with a plurality of audio devices operating in different environments to centralize management of certain aspects of such audio devices.

BACKGROUND

Audio conferencing systems typically involve the use of many devices including one or more microphones for capturing sound from various audio sources active in a conferencing environment (e.g., a conference room, a boardroom, and/or a video conferencing setting) as well as one or more speakers, such as amplified speakers to disseminate the captured sound to a local audience and/or conferencing devices to disseminate the captured sound to a remote audience, such as via a telecast and/or a webcast. Audio production systems typically also involve the use of many devices in multiple locations, including microphones, wireless audio transmitters, wireless audio receivers, audio routing devices, recorders, and/or mixers for capturing, recording, and presenting the sound of productions, such as television programs, newscasts, movies, live events, and other types of productions. The management of the various devices of these different systems is a relatively labor-intensive process whereby these devices are managed manually on premises, and more specifically in the individual rooms or groups of rooms where these devices are located. For example, for certain control functions or software updates, each of the devices at each of the locations where such devices are installed must be interfaced with manually and locally to implement the update. Given these limitations to the management of geographically distributed devices of an audio system and giving the mix of different audio devices operating in different environments, there is a need for a centralized management system which interfaces with a plurality of audio devices to centralize management of certain aspects of such audio devices.

SUMMARY

In certain embodiments, the present disclosure relates to a method of operating an audio system. In these embodiments, the method includes, responsive to receiving, via an application programming interface and from centralized audio device management software, first data associated with an event, communicate second data associated with the event to an audio device, wherein the second data is communicated in association with middleware software capable of being executed by either a processor operating in an on-premises environment or a processor operating in a cloud-native environment.

In certain embodiments, the present disclosure relates to a system including a local processor, and a local memory device that stores a first instance of middleware software.

When executed by the local processor operating in an on premises environment, the first instance of the middleware software controls an audio device based on data associated with an event received from centralized audio device management software via a first application programming interface. The system of these embodiments also includes a remote processor, and a remote memory device that stores a second instance of the middleware software. When executed by the remote processor operating in a cloud-native environment, the second instance of the middleware software controls the audio device based on data associated with the event received from centralized audio device management software via a second application programming interface.

In certain embodiments, the present disclosure relates to a method of operating a system. While a first cloud-based service is being provided to manage an audio device, the method includes tracking a state of the first cloud-based service. Responsive to a termination of the first cloud-based service and following a determination that, at termination, the tracked state of the first cloud-based service comprised an incomplete state, the method of these embodiments includes providing a second cloud-based service to manage the audio device such that the first cloud-based service and the second-cloud based service persistently manage the audio device.

In certain embodiments, the present disclosure relates to a method of operating a system. In these embodiments, the method includes determining, by a processor, a management function of a distributed audio system comprising an internet of things enabled audio device, and causing, by the processor, the determined management function of the distributed audio system to be implemented with the internet of things enabled audio device, wherein the implementation is based on an adaptation of the internet of things enabled audio device.

These and other embodiments, and various permutations and aspects, will become apparent and be more fully understood from the following detailed description and accompanying drawings, which set forth illustrative embodiments that are indicative of the various ways in which the principles of the disclosure may be employed.

BRIEF DESCRIPTION OF THE DRAWINGS

FIG. 2 is a block diagram illustrating an exemplary process employing middleware to facilitate the operation of various audio devices of the audio system of FIG. 1, in accordance with one or more embodiments.

DETAILED DESCRIPTION

Figure 1:
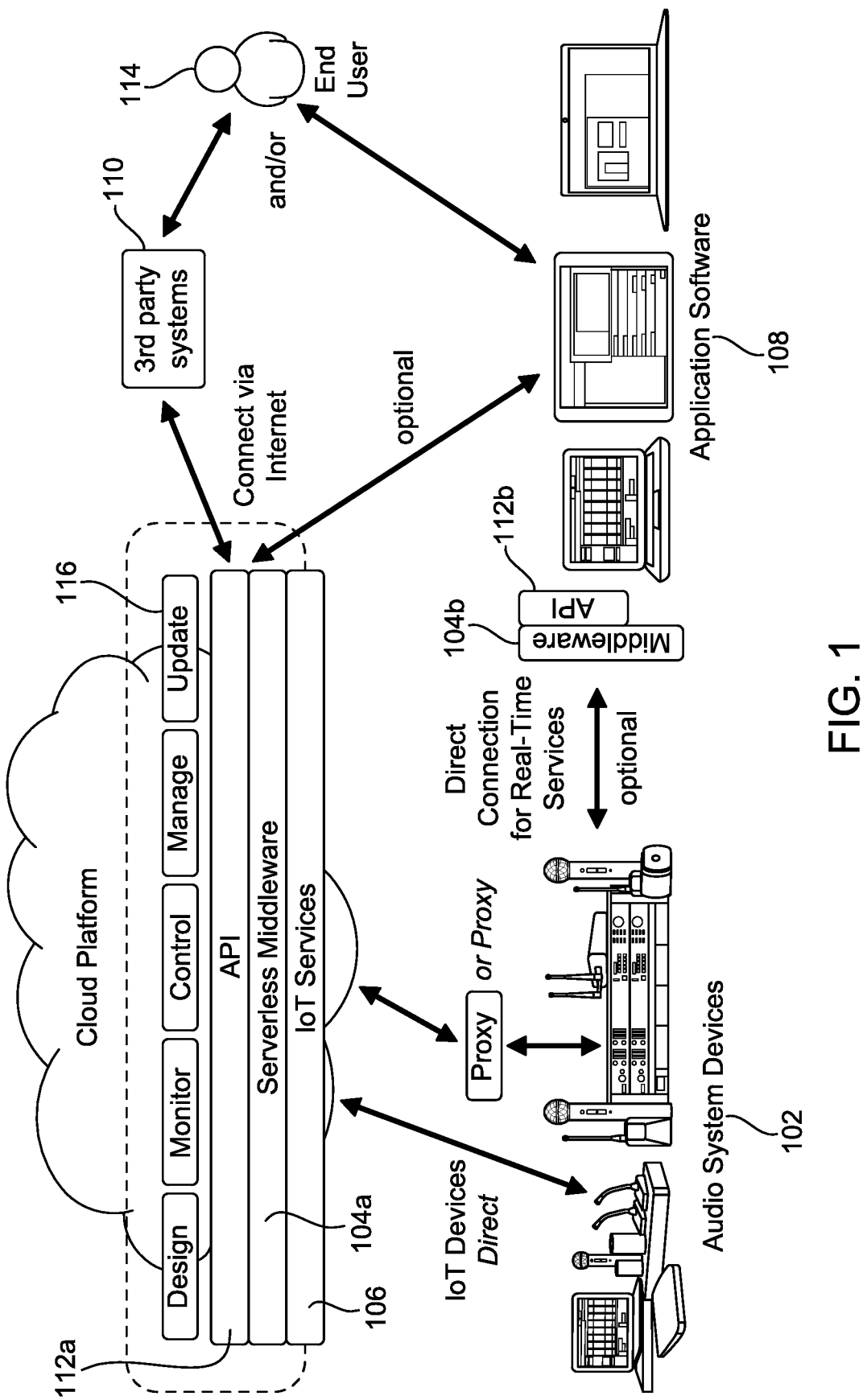
FIG. 1 is a block diagram illustrating an exemplary audio system in accordance with one or more embodiments.

The description that follows describes, illustrates and exemplifies one or more particular embodiments of the disclosure in accordance with its principles. This description is not provided to limit the disclosure to the embodiments described herein, but rather to explain and teach the principles of the disclosure in such a way to enable one of ordinary skill in the art to understand these principles and, with that understanding, be able to apply them to practice not only the embodiments described herein, but also other embodiments that may come to mind in accordance with these principles. The scope of the disclosure is intended to cover all such embodiments that may fall within the scope of the appended claims, either literally or under the doctrine of equivalents.

It should be noted that in the description and drawings, like or substantially similar elements may be labeled with the same reference numerals. However, sometimes these elements may be labeled with differing numbers, such as, for example, in cases where such labeling facilitates a more clear description. Additionally, the drawings set forth herein are not necessarily drawn to scale, and in some instances proportions may have been exaggerated to more clearly depict certain features. Such labeling and drawing practices do not necessarily implicate an underlying substantive purpose. As stated above, the specification is intended to be taken as a whole and interpreted in accordance with the principles of the disclosure as taught herein and understood to one of ordinary skill in the art.

Systems and methods are provided herein for a software-based approach of utilizing on premises middleware or cloud-based middleware (i.e., cloud-native middleware) to manage a distributed network of various audio devices. The middleware of this disclosure comprises a software abstraction service that interfaces with one or more audio devices as well as one or more application programming interfaces (which certain components of an audio system, such as audio application software and audio system management software, interface with) to enable the secure and centralized management of audio devices distributed across one or more networks and/or one or more geographies. That is, the middleware software exposes application-focused interfaces to control software (and developers) on one side, and translates those interfaces into complex domain and audio device-specific discover/read/write/observe actions on the other, whereby the middleware enables such control software to discover audio devices and read/write/observe attributes of such audio devices via various connectivity mechanisms. Specifically, in certain embodiments wherein different components of an audio system, such as different audio devices, execute different software packages, the architecture of the present disclosure employs middleware as an audio system solution that operates by interfacing directly with the different components of the audio system in ways that are specific to each respective component.

For purposes of this disclosure, an audio device associated with the middleware of the present disclosure being run locally and on premises (i.e., on premises middleware) is referred to as an on premises audio device and an audio device associated with the middleware of the present disclosure being run remotely, such as in the cloud (i.e., cloud-based or cloud-native middleware), is referred to as a cloud-connected audio device.

Additionally, it should be appreciated that certain audio devices may qualify at different points in time as either on premises audio devices or cloud-connected audio devices (and certain audio device may qualify at the same time as both on premises audio devices and cloud-connected audio devices), wherein if the audio device is interfacing with middleware running locally and on premises, the audio device is referred to as an on premises audio device and if the audio device is interfacing with middleware running remotely, such as in the cloud, the audio device is referred to as a cloud-connected audio device. Such a configuration of supporting the same middleware being run on-premises, in the cloud, or both simultaneously provides that the middleware of the present disclosure is operable to support control of local audio devices with local control software (when there is no Internet or Internet of Things (IoT)

connection available), and further control local audio devices and cloud-connected audio devices with cloud-based control software (when there is an Internet and/or IoT connection available). As such, the present disclosure provides that multiple instances of the same middleware software may be run by a local processor in an on premises environment and/or by a cloud-based processor in a cloud connected environment whereby separate middleware code does not need to be maintained for these different scenarios.

It should be further appreciated that an audio device may be controlled by cloud-based or cloud-native middleware (thus qualifying that audio device as a cloud-connected audio device) when the audio device is connected to the cloud—either directly (via communication from the audio device directly to/from the cloud middleware on the Internet) or via a proxy (via local software running on a local network, that the audio device communicates with and that passes messages back and forth).

In various embodiments, the middleware operates via locally interfacing with an audio device and audio application software (and/or audio system management software) or by remotely interfacing with an audio device and audio application software (and/or audio system management software) through a serverless cloud environment. Providing such a system wherein audio application software (and/or audio system management software) interfaces, via application programming interfaces, with audio system middleware (which may be local to the audio device or remote from the audio device) and wherein the audio system middleware interfaces with the different distributed audio devices of the audio system enables the audio application software (and/or the audio system management software) to be developed, tested and disseminated in a relatively more efficient way. That is, by configuring audio application software (and/or audio system management software) to operate with a relatively limited quantity of relatively high-level, reusable and relatively easy to consume application programming interfaces (which the middleware is also configured to operate with), the system of the present disclosure reduces testing time and effort for additional features and functions which audio application software, audio system management software and device firmware developers must spend by configuring the additional features and functions for the different audio devices. For example, minimizing or eliminating the need for audio application software to be configured to operate with each of a plurality of different audio devices enables audio application software developers to spend less time on configuring features and functions of the audio application software to specifically operate with each individual audio device.

In addition to streamlining the development of audio application software and/or audio system management software via enabling developers to focus on universal solutions (with the middleware operating to translate such solutions to the individual audio devices), configuring the middleware to persistently interact directly with the different audio devices results in a relatively more efficient system as the middleware is at least partially tasked with certain centralized management functions (thereby potentially alleviating certain of such tasks from other components of the audio system). That is, rather than having to intermittently manually manage, such as control, update, monitor or troubleshoot, each of the audio devices, the middleware of the present disclosure implements a single multi-tenant cloud and IoT based system to persistently manage such audio devices to enable the secure and scalable centralized management of both on premises audio devices (via adding to existing operations without disruption) and cloud-connected audio devices that are distributed across multiple networks and geographies (via consolidated cloud-based services).

More specifically, FIG. 1 illustrates an example embodiment of a computing architecture for managing a distributed system of audio devices. The system of this example embodiment includes a plurality of audio devices 102 configured to interface with audio system middleware (including both cloud-based middleware 104a and on premises middleware 104b). The audio devices comprise any type of suitable non-cloud/IoT connected audio device and/or cloud/IoT connected audio device for facilitating any suitable audio activity, such as, but not limited to, a conference call, a webcast, a telecast, a broadcast, a sound recording, a sound mixing, or audio post production. For example, the audio device 102 includes one or more audio input devices, such as microphones for capturing audio signals and/or one or more audio output devices, such as one or more speakers for broadcasting audio signals. In different embodiments, the audio devices include, but are not limited to, a microphone (e.g., a wired or wireless microphone), a speaker, a transceiver, a mixer, a transmitter, an audio router device, a computer (e.g. a desktop computer and/or a laptop computer), desktop software (e.g., software-based digital signal processor), a mobile device (e.g., a smart phone), a tablet, a wearable device, a smart appliance (e.g., a smart speaker) and/or an IoT device.

In certain embodiments, the audio devices of the audio system utilize existing communications, command, and control mechanisms but with the addition of IoT-based communications to the cloud-based middleware services when direct internet connectivity is available. In certain instances, the firmware of the audio devices is modified to add the ability for such devices to securely register and interact with certain managed cloud-based IoT registration and communications services 106 of FIG. 1, such as, but not limited to, Amazon Web Services IoT, Azure IoT, and Google IoT. This configuration provides that once registered, IoT-enabled firmware audio devices can communicate directly with the serverless middleware services of the present disclosure. That is, this connection to cloud-based middleware enables cloud/IoT devices to be discovered, registered, controlled, monitored, troubleshot, licensed, analyzed (of data collected over time), or firmware updated via the cloud by users interacting with the cloud through local or remote cloud connected software or third-party systems that interface with the centralize cloud management system via centralized application programming interfaces and serverless middleware. Moreover, the connection can also be used for cloud based services on local on-premises audio such as audio storage, sharing, editing, transcription, digital signal processing, and other audio analytics such as sound detection, threat detection, talker counting, and the like.

In certain embodiments, the audio devices of the audio system each includes (or is modified to include) a communication interface operable to exchange data with the audio system middleware over a communications network/connection. In certain such embodiments, one or more audio devices each interfaces directly with the audio system middleware over one or more data networks (including any suitable wired network and/or any suitable wireless network utilizing one or more wireless communication protocols including, but not limited to, Bluetooth™ Bluetooth™ Low Energy ("BLE"), one or more cellular communication standards (e.g., 3G, 4G, LTE), one or more Wi-Fi compatible standards (e.g., 3G, 4G, LTE), one or more high frequency systems (e.g., 900 MHz, 2.4 GHz, and 5.6 GHz communication systems), infrared, any suitable short range communication protocols (e.g., a near field communication ("NFC") protocol), VOIP, TCP-IP, or any other suitable protocol). In these embodiments, when direct connectivity is available, such as when direct internet connectivity is available, the audio device firmware employs an IoT-based communication protocol to communicate audio device firmware communications, command, and control mechanisms to the audio system middleware.

In certain embodiments wherein direct connectivity to the internet from the audio devices is not possible or otherwise allowed, the system of the present disclosure implements one or more proxy-based services on local on-premises computing devices with internet access on-premises to translate local on-premises audio device communications with IoT communications to the audio system middleware. For example, the proxy employs local software running, such as on a personal computer in a room with audio systems or on a server in a local network, that the audio device communicates with and that passes messages back and forth. In these embodiments, the employed proxy service is a gateway to channel communications from on-premises audio devices to the cloud/IoT and middleware services.

Referring back to FIG. 1, in addition to interfacing with one or more audio devices 102, the audio system middleware interfaces with audio application software 108 and/or one or more third party systems 110, such as one or more audio system management systems. In this illustrated embodiment, the audio system of the present disclosure employs one or more audio system application programming interfaces 112a, 112b (which may be the same or different application programming interfaces) to run on top of the audio system middleware (running locally and/or remotely, such as on a cloud platform) to expose standard application programming interface function endpoints, such as implemented in REpresentational State Transfer (REST) based API designs or GraphQL based API designs, to application software 108 and/or third party system services 110 accessible by an end user 114 from anywhere on the internet. Such a configuration provides that the application software and/or audio system management software operates directly on local application programming interface services or on cloud-based application programming interface services to enable user interfaces for a full ecosystem of device management, such as from web-browser based user interfaces or desktop-based software with internet connectivity. In other words, the system of the present disclosure utilizes various cloud and IoT services to enable a full range of device management functions 116, such as design functions, monitoring functions, control functions, management functions, updating functions, discovery functions (not shown), registration functions (not shown), inventory functions (not shown), troubleshooting functions (not shown), event notification functions (not shown), service creation functions (not shown), audio routing and linking functions (not shown), and/or licensing functions (not shown).

Specifically, in certain embodiments, the audio system of the present disclosure employs various levels of application programming interfaces and the audio system middleware to offer application software, audio system management system software and/or third party system services. In these embodiments, the audio system employs one or more fully-document defined application programming interfaces to interface with the audio system middleware. In one such embodiment, the audio system employs a GraphQL application programming interface ("GraphQL API") as an intermediate layer between a REpresentational State Transfer application programming interface ("REST API") and the audio system middleware of the present disclosure. In this embodiment, the audio system layers the application programming interfaces such that a REST API is layered on top of a GraphQL API layered on top of the audio system middleware described herein. Such a configuration enables the audio system middleware to offer different application programming interfaces styles for different users whom have different needs (e.g., more flexibility and efficiency in results of requested data) and/or different preferences associated with how data is communicated between the various components of the audio system of the present disclosure.

More specifically, in certain embodiments, the audio system defines one or more foundational application programming interfaces implemented as GraphQL endpoints and additional endpoints that expose REST APIs that are translated into GraphQL (i.e. a REST API wrapper on a GraphQL API on top of the audio system middleware APIs). Such a configuration provides the benefits of GraphQL over REST (i.e., increased efficiency and specificity) for certain users wanting to take advantage of GraphQL APIs while still providing certain other users the familiarity of working with REST APIs.

In certain embodiments, the APIs of the present disclosure are defined as annotated schema definition language (or SDL) documents and Open API specifications, wherein various methods to auto-generate API code are implemented based on specifications. In certain such embodiments, APIs on devices are auto-generated, such as in C++, to be operable on lower levels of device software stacks directly, while APIs for in the cloud applications and on-prem applications are operable to run on audio system middleware. It should thus be appreciated that the present disclosure provides that the APIs can run in the cloud, on-prem, and also on devices (where subset of API calls applicable to specific devices are defined in the specifications). As such, the present disclosure provides commonality in APIs in the cloud, on-prem, and on devices such that these APIs are all document-driven with automated code development (which, taken together, enables greater re-use, faster implementations, and higher quality).

In certain embodiments, the audio system middleware provides an additional layer of hardware and software components (i.e., hardware and software layer) between the audio devices and the audio application software and/or third-party systems, such as audio system management software. In these embodiments, the hardware and software components of these embodiments include zero, one or more of a server, a memory device, a stand-alone processor, a network, a networking component, a database management system, a cloud application, licensing software, inventory management software, troubleshooting software, device registration software). In certain embodiments, the audio system middleware additionally or alternatively provides an additional layer of virtual entities between the audio devices and the audio application software and/or third-party systems, such as audio system management software. In these embodiments, the virtual entities include zero, one or more of a virtual server, a virtual storage, a virtual network, a virtual application, a virtual operating system, and a virtual client. In certain embodiments, the audio system middleware additionally or alternatively provides an additional layer of cloud-based services between the audio devices and the audio application software and/or third-party systems, such as audio system management software. It should be appreciated that this hardware, processor, and memory may be local to a machine running application software, or may be part of the application software itself (such as the application software installed executable on a PC, a Mac, a server or a web application in a browser that spins up local middleware (and possibly API too) to control or monitor local audio devices.

In certain embodiments, the system provides infrastructure, platforms and software as services such that the audio system middleware employ cloud-based microservices that run in emerging commoditized "serverless" cloud managed services available via the internet, such as Amazon's Lambda, Azure Functions, or Google App Engine. That is, in certain embodiments, the present disclosure utilizes cloud-based audio system middleware to manage or facilitate the management of certain features and functions of an audio system previously reserved for other components of an audio system. However, it should be appreciated that while certain standard commoditized cloud/IoT services exist, certain issues arise when attempting to utilize these services as part of an audio system. Accordingly, the system of the present disclosure utilizes various adaptions to these cloud and IoT services to enable a full range of device management functions (discovery, registration, inventory, design, update, monitor, control, troubleshooting, licensing).

One such adaption is associated with device property tracking of IoT services. By way of background, certain commoditized IoT services use "shadows" to keep track of all registered IoT device state information (properties) over time. While this configuration is acceptable for certain IoT devices like relatively basic IoT sensors and light switches, this configuration is unacceptable for audio system devices which employ a greater quantity of properties. As such, the system of the present disclosures uses device shadows to communicate device property subscriptions rather than all device property states. Such an adaptation enables the relatively complex property-rich components of the audio system to utilize cloud and IoT services to enable a full range of device management functions (discovery, registration, inventory, design, update, control, monitor, troubleshooting, licensing).

Another such adaption is associated with the running service time of components of the audio system. By way of background, prior serverless offerings only host microservices for a limited period of time. However, this limited period of time may not be long enough in duration to ensure successful completion of services by the components of the audio system disclosed herein. Accordingly, the present disclosure adds services to record and track state to restart and reload state when serverless services terminate. That is, to account for existing serverless cloud platforms which "time out" after a relatively short amount of time (and thus would be incompatible with relatively longer running services, such as audio system services like firmware updates), the middleware of the present disclosure keeps track of wireless service state information such that the serverless middleware can handle relatively longer running services, such as audio system services. In other words, since the same middleware software code can be run locally by an on premises processor and/or remotely as a serverless service by a cloud-based processor and since such serverless services have a limited lifespan (unlike an on premises processor), the middleware of the present disclosure enables the pausing and restoring of state information of the middleware processes to account for a first serverless service terminating prior to completion of the middleware task and another serverless service (or a renewal of the same previously terminated serverless service) completing the middleware task. Such an adaptation also enables different components of the audio system to utilize cloud and IoT services to enable a full range of device management functions (discovery, registration, inventory, design, update, monitor, control, troubleshooting, licensing).

Another such adaption is associated with how IoT messages are communicated. By way of background, certain managed cloud and IoT services do not implement features to ensure IoT messages are transacted in a correct order. However, these incorrect ordered messages may cause potential control conflicts or collisions if implemented in an audio system communicating audio data. As such, the present disclosure implements counters to ensure proper delivery order of communicated data, thereby prevents potential control conflicts or collisions. In other words, the adapt IoT services to support the specific needs of audio system devices, the middleware of the present disclosure integrates counters to enable message order guarantees. Such an adaptation further enables different components of the audio system to utilize cloud and IoT services to enable a full range of device management functions (discovery, registration, inventory, design, update, monitor, control, troubleshooting, licensing).

In certain embodiments, in addition to interfacing with cloud based audio system middleware, the application software and/or the audio system management software can also operate connected simultaneously to local middleware services on premises to support real-time use cases, such as real-time monitoring (e.g., metering). In these embodiments, since the cloud middleware application programming interface matches the local application programming interface, both the cloud middleware solution and the local or on premises middleware solution can be used simultaneously. In one such example, the system of the present disclosure employs the audio system middleware to implement abstract audio system control functions and patterns, such as timers, queues, and threads. In this example, the audio system middleware abstracts various operating system features, such as (but not limited to) timers, queues, and threads for both audio device operating in a serverless cloud environment and audio devices operating on premises environments which use native operating system calls. In another such example wherein a device can be simultaneously managed by both on premises middleware and cloud middleware, the cloud middleware is used by cloud software for control of one or more aspects of the device while local middleware is used by local software for monitoring one or more aspects of the device. In another such example wherein a device can be simultaneously managed by both on premises middleware and cloud middleware, the cloud middleware is used by cloud software for monitoring one or more aspects of the device while local middleware is used by local software for controlling one or more aspects of the device. Accordingly, by implementing audio system middleware both in serverless cloud environments and on premises environments which use native operating system calls to enable, the system of the present disclosure is configured to provide any of: (i) cloud-connected audio device management and software operation when connected to the internet, (ii) the cloud-connected audio device management, on premises audio device management and software operation (and real-time monitoring) when connected to the internet, and (iii) on premises audio device management and software operation when not connected to the internet (e.g., the application software runs as programmed only local to local middleware wherein the application software can continue to operate effectively as it does in an existing on-premises-only manner). Such a configuration thus enables the same middleware code of the present disclosure to be run separately or simultaneously in the cloud or locally (with or without a proxy) to support, control and update audio devices.

It should be appreciated that while the application software and audio system management software of the audio system can run even when disconnected from any middleware, the application software and audio system management software must wait until reconnected to some form of middleware, whether running on-premises or in the cloud, to complete certain tasks in association with the audio devices of the system. That is, since certain of the management functions of an audio system of the present disclosure are being implemented, at least in part, by the middleware, the application software and/or audio system management software must be connected to the middleware to process such management functions. As such, by implementing audio system middleware capable of being run in serverless cloud environments (via cloud native IoT interface mechanisms) or on premises environments (via native on premises interface mechanisms) to enable, the system of the present disclosure is further configured to provide fully disconnected software wherein controls are implemented upon reconnection to middleware.

In certain embodiments, the cloud middleware and application programming interfaces authenticate and enforce associations between software and application programming interface users, devices, organization, roles, and permissions, such that the cloud-based system supports multiple tenants and users within each tenant with different roles and permissions. Whenever connected to the cloud services, on-premises systems use the same authentication pattern. Such a configuration enables the seamless transition of different operating environments to accomplish similar tasks. It should be appreciated that while described as utilizing one or more application programming interfaces to facilitate the communication of data between the audio system middleware and the audio application software and the third party systems, other communication protocols, such as REpresentational State Transfer (REST) APIs, GraphQL APIs, Windows Audio Session API (WASAPI), Audio Stream Input/Output (ASIO), Windows Driver Model (WDM), Architecture for Control Networks (ACN), AES67, Transmission Control Protocol (TCP), Telnet, ASCII, Device Management Protocol TCP (DMP-TCP), Websocket, may be used to facilitate the communication of data between the audio system middleware and the audio application software and the third party systems.

In certain embodiments, the audio application software of the present disclosure delivers a software solution for digital signal processing ("DSP") and other forms of audio analytics such as audio enhancement or transformation by machine learning models, transcription, sound detection and classification, threat detection, and counting discrete speakers. In these embodiments, the audio application software is configured to receive audio data from an end user (e.g., audio data in any format either communicated directly from an audio device or uploaded from the audio device to a cloud environment) and apply one or more audio processing functionalities to the audio data. The resulting processed audio data may be communicated back to the same audio device, communicated to a different audio device or hosted online for distribution/streaming. The audio application software offers an audio processing and production platform that provides users with efficient audio processing and production tools, such as, but not limited to, audio mixing capabilities for mixing audio data, audio mastering capabilities for mastering audio data, audio restoration capabilities for restoration of audio data, audio monitoring capabilities for monitoring audio data, audio transformation with machine learned audio processing models for intelligibility or sound quality enhancement, loudness control capabilities for controlling loudness of audio data, audio decoding capabilities for decoding encoded audio data, audio encoding capabilities for encoding unencoded audio data, audio transcoding capabilities for transcoding encoded audio data from one form of coded representation to another, and metadata management capabilities for managing metadata associated with audio data.

In certain embodiments wherein the audio application software is associated with an audio conferencing system, the audio application software comprises a conferencing application that operates with computing resources to service a single room, venue or location or multiple rooms, venues or locations of microphones and loudspeakers. For example, the computing resources can be either a dedicated resource, meaning its only intended use and purpose is for conference audio processing, or a shared resource, meaning it is also used for other in-room services, such as, e.g., a soft codec platform or document sharing. In either case, placing the software solution on a pre-existing computing resource lowers the overall cost and complexity of the conferencing platform of this example. The computing device can support network audio transport, USB, or other analog or digital audio inputs and outputs and thereby, enables the computing device (e.g., PC) to behave like DSP hardware and interface with audio devices and a hardware codec. The conferencing platform also has the ability to connect as a virtual audio device driver to third-party soft codecs (e.g., third-party conferencing software) running on the computing device. In one embodiment, the conferencing application utilizes C++ computer programing language to enable cross-platform development.

The conferencing application of this example embodiment may be flexible enough to accommodate very diverse deployment scenarios, from the most basic configuration where all software architecture components reside on a single laptop/desktop, smart phone, server, or web browser-based application, to becoming part of a larger client/server installation and being monitored and controlled by, for example, proprietary conferencing software or third-party controllers. In some embodiments, the conferencing application product may include server-side enterprise applications that support different users (e.g., clients) with different functionality sets. In these embodiments, remote status and error monitoring, as well as authentication of access to control, monitoring, and configuration settings, can also be provided by the conferencing application operating with the audio system middleware. Supported deployment platforms may include, for example, Windows 8 and 10, MAC OS X, etc.

The conferencing application of this example embodiment can run as a standalone component and be fully configurable to meet a user's needs via a user interface associated with the product. In some cases, the conferencing application may be licensed and sold as an independent conferencing product. In other cases, the conferencing application may be provided as part of a suite of independently deployable, modular services in which each service runs a unique process and communicates through a well-defined, lightweight mechanism to serve a single purpose.

In certain embodiments, the audio application software (and/or the audio system middleware) is associated with one or more indexed libraries for storing, sharing, and accessing different audio files. In different embodiments, the audio application software (and/or the audio system middleware) is associated with one or more audio suites for sound effects, one or more audio suites for noise reduction/noise suppression/noise cancellation, one or more libraries of other types of audio plugins, one or more audio libraries of audio sources, one or more audio libraries of audio processing algorithms (e.g., filtering, equalization, dynamic range control, reverberation, etc.), and one or more audio libraries of audio-related measurements.

In operation, the audio system of the present disclosure employs the audio system middleware to implement part or all of certain management functions of the audio system. In various embodiments, the audio system middleware at least partially provides one or more audio device management services including, but not limited to, audio device discovery, audio device registration, audio device inventory, audio device design, audio device updating, audio device monitoring, audio device control, audio device troubleshooting, and audio device licensing. That is, certain audio system controls are at least partially handled by the middleware in a persistent fashion (or alternatively in an intermittent fashion) such that the implemented middleware is capable to run separately or simultaneously locally or in the cloud to enable seamless joint on-premises and cloud-connected audio device management such as monitoring, control, and updating.

More specifically, FIG. 2 is a flowchart of an example process or method of operating the audio system of the present disclosure. In various embodiments, the process is represented by a set of instructions stored in one or more memories and executed by one or more processors. Although the process is described with reference to the flowchart shown in FIG. 2, many other processes of performing the acts associated with this illustrated process may be employed. For example, the order of certain of the illustrated blocks or diamonds may be changed, certain of the illustrated blocks or diamonds may be optional, or certain of the illustrated blocks or diamonds may not be employed.

As seen in block 202 of FIG. 2, audio application software and/or a third party audio management system communicates, via one or more application programming interfaces and to audio system middleware, data associated with a persistent management of a plurality of audio devices. Upon receiving the data from the audio application software and/or the third party audio management system, as indicated in blocks 204 and 206, the audio system middleware determines and communicates a set of instructions to at least a first of the audio devices, wherein the set of instructions is based on the data associated with the persistent management of the plurality of audio devices and communicated to at least the first of the audio devices regardless of whether the audio system middleware is being run locally (e.g., when there is no Internet or IoT connection available) or being run remotely (e.g., when there is an Internet and/or IoT connection available). Such a configuration of enabling the same middleware to operate in a plurality of different environments provides a scalable management of geographically distributed audio devices wherein separate middleware code does not need to be maintained for different operational scenarios.

In certain embodiments, the audio system middleware interfaces, via one or more application programming interfaces, with audio application software and/or audio system management software to manage monitoring features of the audio system. In these embodiments, the audio system includes a monitoring component, such as a monitoring component in communication with one or more monitoring servers. In certain embodiment, the monitoring component includes monitoring and control software designed to monitor the overall enterprise or network and individually control each device, or application, included therein. In certain embodiments, the middleware operates with audio application software and/or audio system management software to authenticate a user, authorize the user's permissions, detect events, and notify users based on those events. Such a configuration enables the middleware to monitor and control one or more components of the audio system the same way as any other hardware in the audio system.

In certain embodiments, the monitoring component includes one or more data storage devices configured for implementation of a persistent storage for data such as, e.g., presets, log files, user-facing events, configurations for audio interfaces, configurations for a virtual audio device driver, current state of the different components of the audio system, user credentials, and any data that needs to be stored and recalled by the end user. For example, the data storage devices may include an event log database and/or a resource monitoring database. The data storage devices may save data in flash memory or other memory devices enabling relatively easy retrieval of data history using pagination and filtered data queries. In certain embodiments, the event log database is configured to receive event information from one or more components of the audio system, such as the audio system middleware, and generate user-facing events based on pre-defined business rules or other settings. For example, the event log can subscribe for system events and provide user-facing actionable events to help the user identify problems and have a relatively clearer understanding of what needs to be done to fix the problems. The event log database may maintain a history of events that is retrievable upon request from any controller software. In certain embodiments, pagination of history is employed if the end user is configured to keep history for a long period of time.

It should be appreciated that utilizing the audio system middleware in association with event logging enables the middleware to additionally or alternatively facilitate troubleshooting of the different components of the audio system. In certain embodiments, each component of the audio system architecture is configured to log every event that occurred in that subsystem, wherein logging has a relatively low impact on each component's behavior, and follow a common format across the board. In these embodiments, the end user can use a web browser-based application (or other component user interface (CUI)) to configure the length of time the user wants to keep log files. In certain embodiments, audio system developers can analyze log files and identify the problem the end user is experiencing. In some cases, a tool for analyzing log files may be provided with many different ways to search and visualize log data. This tool enables the user to create a data set for a specific issue and analyze it by creating specific queries.

In certain embodiments, the audio system middleware interfaces, via one or more application programming interfaces, with audio application software and/or audio system management software to additionally or alternatively manage licensing features of the audio system. In these embodiments, the audio system includes a licensing component, such as licensing component in communication with one or more licensing servers. The licensing component is configured to validate audio system components, such as audio devices, behavior according to the license purchased by an end user, such as ensuring that only a licensed number of channels are being used to exchange or communicate audio and/or control data, or that only certain functionality or performance levels are available. In certain embodiments, limitations that are driven by the license purchased by the user limit the user's actions in the user interface (e.g., web-based application or system monitoring application), wherein a license library may be linked into the audio system middleware, via the licensing server and/or the licensing component, and additional code may be executed to interface with the license library to validate license capabilities. In these embodiments, the validation of a given license can happen on a timer (e.g., every 24 hours) to assure that license is still valid. In certain embodiments, the licenses enable for various license combinations, and the licensing component is configured to aggregate or segregate the licensed number of channels in order to accommodate a given audio environment. For example, a conferencing project with two rooms requiring four channels each could be covered by a single license containing eight channels. The licensing server of this example can include a third-party license management tool (e.g., Flexera FLexNet Operations (FNO)) that provides entitlement management, as well as managing timing and compliance issues, enables customers to install licensed software, and otherwise handles all licensing needs for the audio system. In another example, the audio system middleware implements a per use license model with flexible deployment and pricing options, thereby enabling users' capabilities that require on a per project basis, such that the users are billed or invoiced per use.

In certain embodiments, the audio system middleware interfaces, via one or more application programming interfaces, with audio application software and/or audio system management software to additionally or alternatively manage component updating features of the audio system. In these embodiments, the audio system includes an update component which operates with the middleware to maintain and distribute one or more upgrades/updates that are downloadable to the different components of the audio system, such as a software update and/or a firmware upgrade of one or more audio devices of the audio system.

In certain embodiments, the audio system middleware interfaces, via one or more application programming interfaces, with audio application software and/or audio system management software to additionally or alternatively manage operational features of the audio system. In certain embodiments, the audio system middleware interfaces, via one or more application programming interfaces, with audio application software and/or audio system management software to additionally or alternatively manage usage features of the audio system. In such embodiments, the audio system middleware receive data from one or more components of the audio system and monitors, records, and reports usage time of the components based on the data. In different embodiment, the data received from the component (which the middleware utilizes to manage usage features of the audio system) includes, but is not limited to, an audio, configuration state of the component of the audio system, a control signal associated with the component of the audio system (such as data associated with of one or more features to add to or remove from the component of the audio system or data associated with when the component of the audio system starts or stops a feature), a performance signal associated with the component of the audio system (such as data associated with a technical quality of data communications/transmissions between the components of the audio system, such as response time, loss, signal-to-noise ratio, cross-talk, echo, interrupts, bit rate, loudness levels, frequency response, frame rate, and codec), location status of the component of the audio system (such as geolocation information associated with a current location of the component of the audio system).

Figure 3:
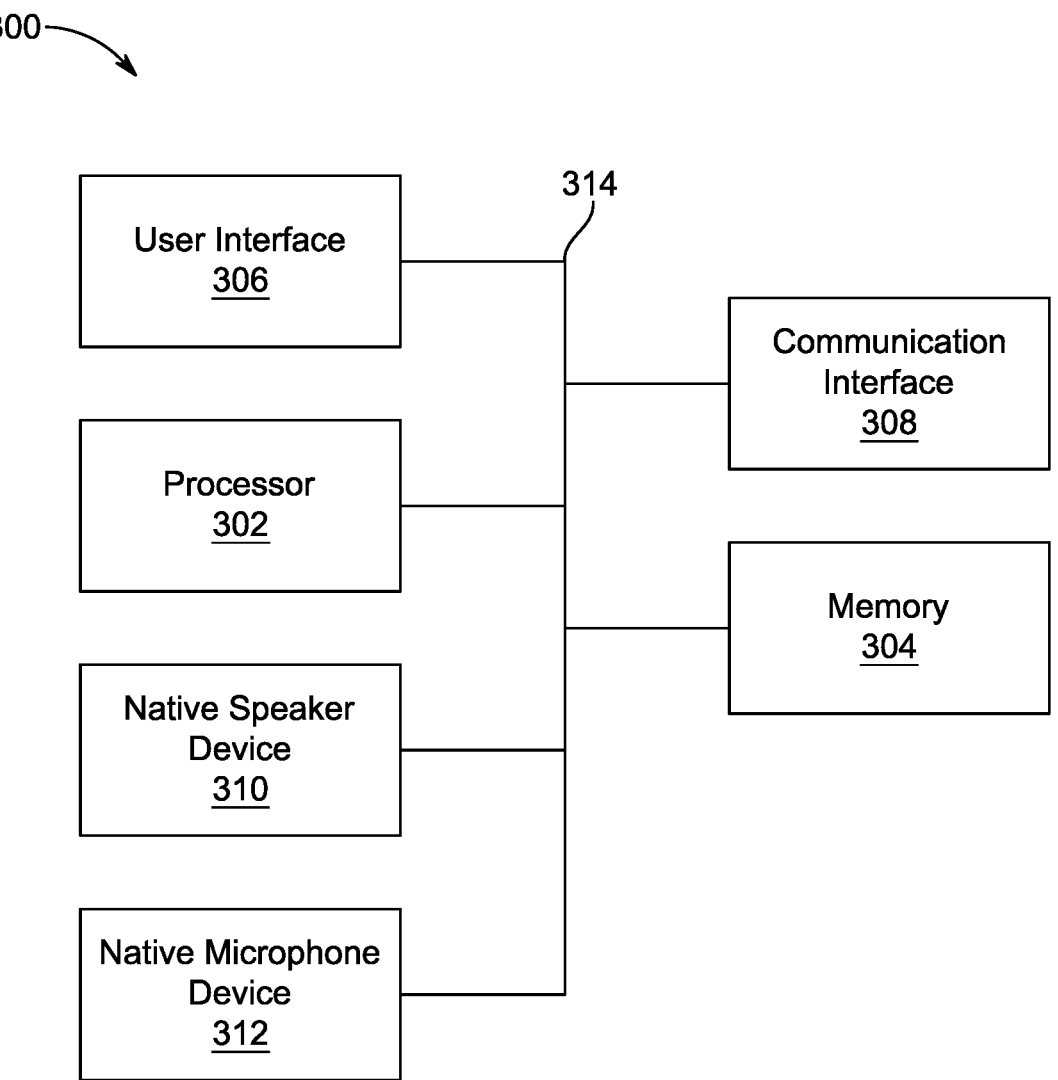
FIG. 3 is a block diagram illustrating an exemplary computing device of the audio system of FIG. 1, in accordance with embodiments.

As described above, the audio system disclosed herein utilizes various components which operate with the middleware to provide scalable management of geographically distributed audio devices. Certain of these components utilize one or more computing devices to execute one or more functions or acts disclosed herein. FIG. 3 illustrates a simplified block diagram of an exemplary computing device 300 of the audio system disclosed herein.

The computing device 300 may include various components, including for example, a processor 302, memory 304, user interface 306, communication interface 308, native speaker device 310, and native microphone device 312, all communicatively coupled by system bus, network, or other connection mechanism 314. It should be understood that examples disclosed herein may refer to computing devices and/or systems having components that may or may not be physically located in proximity to each other. Certain embodiments may take the form of cloud based systems or devices, and the term "computing device" should be understood to include distributed systems and devices (such as those based on the cloud), as well as software, firmware, and other components configured to carry out one or more of the functions described herein. Further, as noted above, one or more features of the computing device 300 may be physically remote (e.g., a standalone microphone) and may be communicatively coupled to the computing device, via the communication interface 308, for example.

Processor 302 may include a general purpose processor (e.g., a microprocessor) and/or a special purpose processor (e.g., a digital signal processor (DSP)). Processor 304 may be any suitable processing device or set of processing devices such as, but not limited to, a microprocessor, a microcontroller-based platform, an integrated circuit, one or more field programmable gate arrays (FPGAs), and/or one or more application-specific integrated circuits (ASICs).

The memory 304 may be volatile memory (e.g., RAM including non-volatile RAM, magnetic RAM, ferroelectric RAM, etc.), non-volatile memory (e.g., disk memory, FLASH memory, EPROMs, EEPROMs, memristor-based non-volatile solid-state memory, etc.), unalterable memory (e.g., EPROMs), read-only memory, and/or high-capacity storage devices (e.g., hard drives, solid state drives, etc.). In some examples, the memory 304 includes multiple kinds of memory, particularly volatile memory and non-volatile memory.

The memory 304 may be computer readable media on which one or more sets of instructions, such as the software for operating the methods of the present disclosure can be embedded. The instructions may embody one or more of the methods or logic as described herein. As an example, the instructions can reside completely, or at least partially, within any one or more of the memory 304, the computer readable medium, and/or within the processor 302 during execution of the instructions.

The terms "non-transitory computer-readable medium" and "computer-readable medium" include a single medium or multiple media, such as a centralized or distributed database, and/or associated caches and servers that store one or more sets of instructions. Further, the terms "non-transitory computer-readable medium" and "computer-readable medium" include any tangible medium that is capable of storing, encoding or carrying a set of instructions for execution by a processor or that cause a system to perform any one or more of the methods or operations disclosed herein. As used herein, the term "computer readable medium" is expressly defined to include any type of computer readable storage device and/or storage disk and to exclude propagating signals.

User interface 306 may facilitate interaction with a user of the device. As such, user interface 306 may include input components such as a keyboard, a keypad, a mouse, a touch-sensitive panel, a microphone, and a camera, and output components such as a display screen (which, for example, may be combined with a touch-sensitive panel), a web-based application, a sound speaker, and a haptic feedback system. The user interface 306 may also comprise devices that communicate with inputs or outputs, such as a short-range transceiver (RFID, Bluetooth, etc.), a telephonic interface, a cellular communication port, a router, or other types of network communication equipment. The user interface 306 may be internal to the computing device 300, or may be external and connected wirelessly or via connection cable, such as through a universal serial bus port.

Communication interface 308 may be configured to allow the device 300 to communicate with one or more devices (or systems) according to one or more protocols. In one example, the communication interface 308 may be a wired interface, such as an Ethernet interface or a high-definition serial-digital-interface (HD-SDI). As another example, the communication interface 308 may be a wireless interface, such as a cellular, Bluetooth, or WI-FI interface.

In some examples, communication interface 308 may enable the computing device 300 to transmit and receive information to/from one or more microphones and/or speakers. This can include lobe or pick-up pattern information, position information, orientation information, commands to adjust one or more characteristics of the microphone, and more.

Data bus 314 may include one or more wires, traces, or other mechanisms for communicatively coupling the processor 302, memory 304, user interface 306, communication interface 308, native speaker 310, native microphone 312, and or any other applicable computing device component.

In embodiments, the memory 304 stores one or more software programs for implementing or operating all or parts of the audio system platform described herein and/or methods or processes associated therewith. According to one aspect, a computer-implemented method of employing middleware to manage or facilitate the management of various features of an audio system can be implemented using one or more computing devices 300 and can include all or portions of the operations disclosed herein.

This disclosure is intended to explain how to fashion and use various embodiments in accordance with the technology rather than to limit the true, intended, and fair scope and spirit thereof. The foregoing description is not intended to be exhaustive or to be limited to the precise forms disclosed. Modifications or variations are possible in light of the above teachings. The embodiment(s) were chosen and described to provide the best illustration of the principle of the described technology and its practical application, and to enable one of ordinary skill in the art to utilize the technology in various embodiments and with various modifications as are suited to the particular use contemplated. All such modifications and variations are within the scope of the embodiments as determined by the appended claims, as may be amended during the pendency of this application for patent, and all equivalents thereof, when interpreted in accordance with the breadth to which they are fairly, legally and equitably entitled.

The invention claimed is:

1. A method of operating an audio system, the method comprising:

responsive to receiving, via an application programming interface and from centralized audio device management software, first data associated with an event, communicate second data associated with the event to control an audio device, wherein the second data is communicated by middleware software capable of being executed by either a processor operating in an on-premises environment or a processor operating in a cloud-native environment, wherein the event is associated with a first cloud-based service;

identifying, by the middleware software, at least one termination of the first cloud-based service; and responsive to detecting that the first cloud-based service comprised an incomplete state upon the at least one termination, connecting, by the middleware software, a second cloud-based service to enable persistent management of the audio device and the event.

2. The method of claim 1, wherein the event is associated with a management function of the centralized audio device management software for managing the audio device.

3. The method of claim 2, wherein the management function is selected from a group consisting of an update of the audio device, a control of the audio device, a discovery function, a registration function, a control function, an event notification function, a service creation function, an audio routing function, a linking function, a troubleshooting function, a licensing function, a monitoring function and an inventory maintenance function.

4. The method of claim 1, wherein the centralized audio device management software is associated with a third-party system.

5. The method of claim 1, wherein the second data is based on the audio device being associated with a set of permissions.

6. The method of claim 1, wherein the second data is based on the audio device being associated with a role.

7. The method of claim 1, wherein the second data is based on the audio device being associated with a user.

8. The method of claim 1, wherein the second data is communicated to the audio device via a proxy service.

9. The method of claim 1, wherein the audio device is selected from a group consisting of: a microphone, an audio transmitter, an audio receiver, an audio recorder, a speaker, an audio routing device, an audio processor and an audio mixer.

10. The method of claim 1, wherein the audio device comprises an internet of things enabled audio device.

11. The method of claim 10, further comprising determining a plurality of shadows of the internet of things enabled audio device at a plurality of different points in time and determining, based on the plurality of shadows, a property subscription of the internet of things enabled audio device.

12. The method of claim 10, further comprising employing a counter such that the second data is communicated in a designated order.

13. The method of claim 1, wherein the application programming interface comprises a representational state transfer application programming interface associated with a GraphQL application programming interface.

14. A system comprising:

a local processor;

a local memory device that stores a first instance of middleware software that, when executed by the local processor operating in an on premises environment, cause the local processor to execute the first instance of the middleware software to control an audio device based on data associated with an event received from centralized audio device management software via a first application programming interface, wherein the event is associated with a first cloud-based service;

a remote processor; and a remote memory device that stores a second instance of the middleware software that, when executed by the remote processor operating in a cloud-native environment, cause the remote processor to execute the second instance of the middleware software to control the audio device based on the data associated with the event received from the centralized audio device management software via a second application programming interface, identify at least one termination of the first cloud-based service, and responsive to detecting that the first cloud-based service comprised an incomplete state upon the at least one termination, connect to a second cloud-based service to enable persistent management of the audio device and the event.

15. The system of claim 14, wherein the local processor executes the first instance of the middleware software when the cloud-native environment is not available.

16. The system of claim 14, wherein the event is associated with a management function of the centralized audio device management software for managing the audio device.

17. The system of claim 16, wherein the management function is selected from the group consisting of an update of the audio device, a control of the audio device, a discovery function, a registration function, a control function, an event notification function, a service creation function, an audio routing function, a linking function, a troubleshooting function, a licensing function, a monitoring function and an inventory maintenance function.

18. The system of claim 14, wherein the centralized audio device management software is associated with a third-party system.

19. The system of claim 14, wherein the data is based on the audio device being associated with at least one of: a set of permissions, a role, and a user.

20. The system of claim 14, wherein the data is communicated to the audio device via a proxy service.

21. The system of claim 14, wherein the audio device is selected from a group consisting of: a microphone, an audio transmitter, an audio receiver, an audio recorder, a speaker, an audio routing device, an audio processor and an audio mixer.

22. The system of claim 14, wherein the first application programming interface is different from the second application programming interface.

23. The system of claim 14, wherein at least one of the first application programming interface and the second application programming interface comprises a representational state transfer application programming interface associated with a GraphQL application programing interface.

24. The system of claim 14, wherein the audio device comprises an internet of things enabled audio device.

25. The system of claim 24, wherein when executed by the remote processor operating in the cloud-native environment, the second instance of the middleware software causes the remote processor to determine a plurality of shadows of the internet of things enabled audio device at a plurality of different points in time and determine, based on the plurality of shadows, a property subscription of the internet of things enabled audio device.

26. The system of claim 24, wherein when executed by the remote processor operating in the cloud-native environment, the second instance of the middleware software causes the remote processor to communicate, via a counter, the data associated with the event in a designated order.

* * * * *